(12) United States Patent
Quinquis et al.

(10) Patent No.: US 11,794,929 B2
(45) Date of Patent: Oct. 24, 2023

(54) METHOD FOR EJECTING A PAYLOAD FROM A SPACECRAFT DRIVEN BY A CONTINUOUS PROPULSION FORCE

(71) Applicant: ARIANEGROUP SAS, Paris (FR)

(72) Inventors: Isabelle Quinquis, Rueil Malmaison (FR); Siegfrid Chavy, Mont Javoult (FR); Jean-Michel Sannino, Saint Marcel (FR)

(73) Assignee: ARIANEGROUP SAS, Paris (FR)

( * ) Notice: Subject to any disclaimer, the term of this patent is extended or adjusted under 35 U.S.C. 154(b) by 441 days.

(21) Appl. No.: 16/961,939

(22) PCT Filed: Jan. 11, 2019

(86) PCT No.: PCT/FR2019/050059
§ 371 (c)(1),
(2) Date: Jul. 14, 2020

(87) PCT Pub. No.: WO2019/141925
PCT Pub. Date: Jul. 25, 2019

(65) Prior Publication Data
US 2020/0385150 A1  Dec. 10, 2020

(30) Foreign Application Priority Data
Jan. 16, 2018  (FR) ...................... 1850356

(51) Int. Cl.
*B64G 1/64*  (2006.01)
*B64G 1/00*  (2006.01)
*B64G 1/40*  (2006.01)

(52) U.S. Cl.
CPC ............. *B64G 1/641* (2013.01); *B64G 1/007* (2013.01); *B64G 1/401* (2013.01); *B64G 1/402* (2013.01); *B64G 1/403* (2013.01); *B64G 2001/643* (2013.01)

(58) Field of Classification Search
CPC ........ B64G 1/641; B64G 1/007; B64G 1/401; B64G 1/402; B64G 1/403; B64G 2001/643
See application file for complete search history.

(56) References Cited

U.S. PATENT DOCUMENTS

| 5,566,909 | A | * | 10/1996 | Lapins | .................. | B64G 1/105 244/63 |
| 5,605,308 | A | * | 2/1997 | Quan | ..................... | B64G 1/641 244/137.1 |
| 6,827,313 | B1 | | 12/2004 | Aldrin | | |
| 9,463,882 | B1 | | 10/2016 | Field et al. | | |

(Continued)

FOREIGN PATENT DOCUMENTS

FR       2729117 A1       7/1996

OTHER PUBLICATIONS

Search Report issued in French Patent Application No. 1850356 dated Aug. 27, 2018.

(Continued)

*Primary Examiner* — Justin M Benedik
(74) *Attorney, Agent, or Firm* — Pearne & Gordon LLP

(57) ABSTRACT

An ejection method (100) for ejecting at least one payload such as a satellite. The ejection method includes a step (108) of ejecting the payload from a spacecraft that is driven by a continuous propulsion force when the satellite is ejected.

17 Claims, 4 Drawing Sheets

(56) References Cited

U.S. PATENT DOCUMENTS 10,538,348 B2\* 1/2020 Riskas .................... B64G 1/10
2015/0102174 A1 4/2015 Chu

OTHER PUBLICATIONS

International Search Report for International Patent Application No. PCT/FR2019/050059 dated Apr. 15, 2019.
Written Opinion for International Patent Application No. PCT/FR2019/050059 dated Apr. 15, 2019.

\* cited by examiner

METHOD FOR EJECTING A PAYLOAD FROM A SPACECRAFT DRIVEN BY A CONTINUOUS PROPULSION FORCE

This is the National Stage of PCT international application PCT/FR2019/050059, filed on Jan. 11, 2019 entitled "METHOD FOR EJECTING A PAYLOAD FROM A SPACECRAFT DRIVEN BY A CONTINUOUS PROPULSION FORCE", which claims the priority of French Patent Application No. 1850356 filed Jan. 16, 2018, both of which are incorporated herein by reference in their entirety.

TECHNICAL FIELD

The invention relates to the field of space applications. More precisely, the invention relates to the ejection of at least one payload by a spacecraft such as a launcher or an orbital spacecraft.

BACKGROUND OF THE ART

Several payloads, in practice satellites, can be placed in orbit by a spacecraft that is propelled by intermittence. These phases of propulsion by intermittence are specific to the ejection of each payload, in order to prevent the collision of payloads between them or with the spacecraft.

These phases of propulsion by intermittence tend to increase the consumption of propellant material, in particular due to the fact of reigniting the engines and of dispersing propellant in at least one tank during the ballistic phases that take place between the propulsion phases.

Moreover, these phases of propulsion by intermittence make the trajectory of the spacecraft and of the satellites complex to predict and to implement. These phases of propulsion by intermittence also increase the number of activation, operating and deactivating cycles of the systems onboard.

So there is a need to eject payloads on orbit, by preventing the collisions of payloads between them or with the spacecraft, while still limiting the consumption of propellant material and, if possible, the complexity of the trajectories of the payloads and of the spacecraft.

DISCLOSURE OF THE INVENTION

The invention aims to resolve at least partially the problems encountered in the solutions of the prior art.

In this respect, the invention has for object a method for ejecting at least one payload such as a satellite. According to the invention, the method for ejecting comprises a step of ejecting the payload from a spacecraft that is driven by a continuous propulsion force when the satellite is ejected.

The method for ejecting according to the invention makes it possible to eject at least one payload on orbit, by preventing the collisions of at least one payload with other satellites or with the spacecraft, while still limiting the consumption of propellant material. Advantageously, the method for ejecting limits the complexity of the trajectory of the payload and that of the spacecraft.

In particular, the consumption of propellant material is reduced due to the limitation in the number of ignition and extinction of the propulsion means of the spacecraft.

The spacecraft is driven by the continuous propulsion force with respect to the celestial body around which it is in orbit, in addition to the force of gravity.

The propulsion force is continuous at least when the satellite is ejected. Consequently, the spacecraft is driven by the continuous propulsion force with respect to the payload immediately after the ejection, which tends to move the trajectory of the spacecraft away from that of this payload and to avoid collisions.

The invention can optionally include one or more of the following characteristics combined together or not.

Preferably, the step of ejecting comprises an ejection order of the payload and the ejection physically of the at least one payload of the spacecraft following the ejection order.

According to a particular embodiment, the method for ejecting comprises the ejection of several payloads from the spacecraft during the flight of the spacecraft.

According to a particular embodiment, the step of ejecting comprises the ejection of at least one first group of payloads comprising at least one payload, and/or the ejection of at least one second group of payloads comprising at least one payload.

The method for ejecting makes it possible to eject several payloads on orbit, by preventing the collision of the payloads between them and with the spacecraft, while still limiting the consumption of propellant material.

According to a particular embodiment, the payloads of the first group are simultaneously ejected from the spacecraft.

According to a particular embodiment, the payloads of the second group are simultaneously ejected from the spacecraft.

Preferably, the step of ejecting comprises a simultaneous ejection order of the payloads of the first group and the ejecting physically of the payloads of the first group from the spacecraft following the ejection order.

Preferably, the step of ejecting comprises a simultaneous ejection order of the payloads of the second group and the ejecting physically of the payloads of the second group from the spacecraft following the ejection order.

Ejecting payloads simultaneously makes it possible to more easily limit the modifications of the trajectory of the spacecraft caused by the ejection of the payloads.

Generally, the payloads of a group are ejected simultaneously or at intervals which are each much less than that between the instant of ejection of payloads of one group and that of the ejection of payloads of another group.

According to a particular embodiment, the payloads of the first group and/or those of the second group are ejected in directions which are equally distributed about the longitudinal axis of the spacecraft, in particular if the payloads are identical.

According to a particular embodiment, the payloads of the first group and/or those of the second group are ejected orthogonally to the longitudinal axis of the spacecraft.

According to a particular embodiment, the step of ejecting comprises the ejection of two payloads according to a direction orthogonal to the longitudinal axis of the spacecraft and in opposite directions.

According to a particular embodiment, the method of ejecting comprises a step of orienting the longitudinal axis of the spacecraft with respect to the orbital plane, before the ejection of at least one payload.

According to a particular embodiment, a step of rotating the spacecraft about its longitudinal axis in order to orient the at least one payload in rotation with respect to the orbital plane before the ejection thereof.

According to a particular embodiment, the method for ejecting comprises the ejection of at least two payloads with identical orientations on their orbit.

According to a particular embodiment, the angle between the continuous propulsion force of the spacecraft and the orbital speed of the spacecraft during the ejection is non-zero.

According to a particular embodiment, the continuous propulsion force is oriented according to a longitudinal axis of the spacecraft during the ejection.

According to a particular embodiment, the continuous propulsion force of the spacecraft is oriented in the direction of the orbital speed during the ejection.

In this case, the continuous propulsion force tends to increase the orbit of the spacecraft, for example before the ejection of a payload.

According to another particular embodiment, the continuous propulsion force is oriented in a direction opposite the orbital speed during the ejection.

In this case, the continuous propulsion force tends to reduce the orbit of the spacecraft, for example before the ejection of a payload.

According to a particular embodiment, the method of ejecting comprises a step of main propulsion to carry the spacecraft on an orbit before the step of ejecting, the intensity of the continuous propulsion being strictly less than the intensity of the main propulsion force.

According to a particular embodiment, the ratio of the intensity of the continuous propulsion over the intensity of the main propulsion force is comprised between $5*10^{-4}$ and $5*10^{-3}$, preferably between $3.84 * 10^{-4}$ and/or $3.84*10^{-3}$.

According to a particular embodiment, the ratio of the duration of the main propulsion force over the duration of the continuous propulsion is comprised between 0.05 and 1, preferably between 0.05 and 0.6.

According to a particular embodiment, the spacecraft is propelled by at least one propellant which is stored in powder or liquid form in a tank.

The permanent acceleration resulting from the continuous propulsion force tends to maintain the propellant at the bottom of its tank, and therefore to limit the displacements and heating thereof in contact with the walls of the tank. The consumption of propellant material is then all the more so reduced during the implementation of the method for ejecting, in particular if the main propulsion is restarted later.

According to a particular embodiment, the spacecraft is driven by a continuous propulsion force between the step of ejecting the first group of payloads and the step of ejecting the second group of payloads.

According to a particular embodiment, the spacecraft is driven by a continuous propulsion force from the step of ejecting the first group of payloads at least to the step of ejecting the second group of payloads.

According to a particular embodiment, the spacecraft is driven by a continuous propulsion force from the stopping of the main propulsion force at least until the payload or all the payloads are ejected from the spacecraft.

The spacecraft is then still driven by a propulsion force until the payload or all the payloads are ejected from the spacecraft.

According to a particular embodiment, the spacecraft is again driven by the main propulsion force, when the payload or all the payloads have been ejected from the spacecraft.

BRIEF DESCRIPTION OF THE DRAWINGS

The present invention will be better understood when reading the description of embodiments, given solely for the purposes of information and in no way limiting, in reference to the accompanying drawings wherein.

DETAILED DISCLOSURE OF PARTICULAR EMBODIMENTS

Identical, similar or equivalent portions of the different figures bear the same numerical references so as to facilitate passing from one figure to the other.

FIGS. 1 to 5 show the steps of a method for ejecting 100 a first group 10 of satellites by a spacecraft 1, according to a first embodiment.

The spacecraft 1 is for example a launcher or an orbital spacecraft. It may or may not be reusable. It is configured to embark one or more payloads such as satellites, orbital vehicles, space probes, orbital service kits, etc. In the first embodiment, it embarks two satellites 11, 12 which form a first group 10 of satellites. These satellites 11, 12 are for example inert bodies, i.e. they are devoid of means of propulsion.

Figure 3:
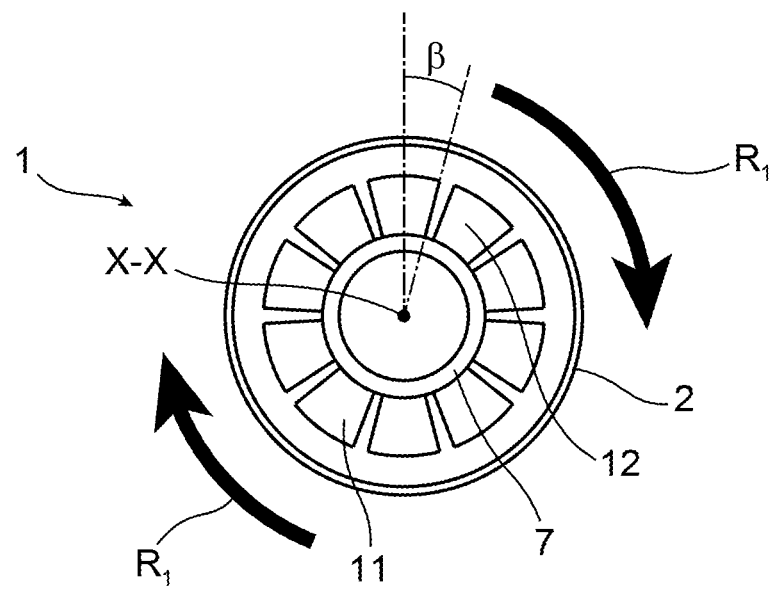
Figure 4:
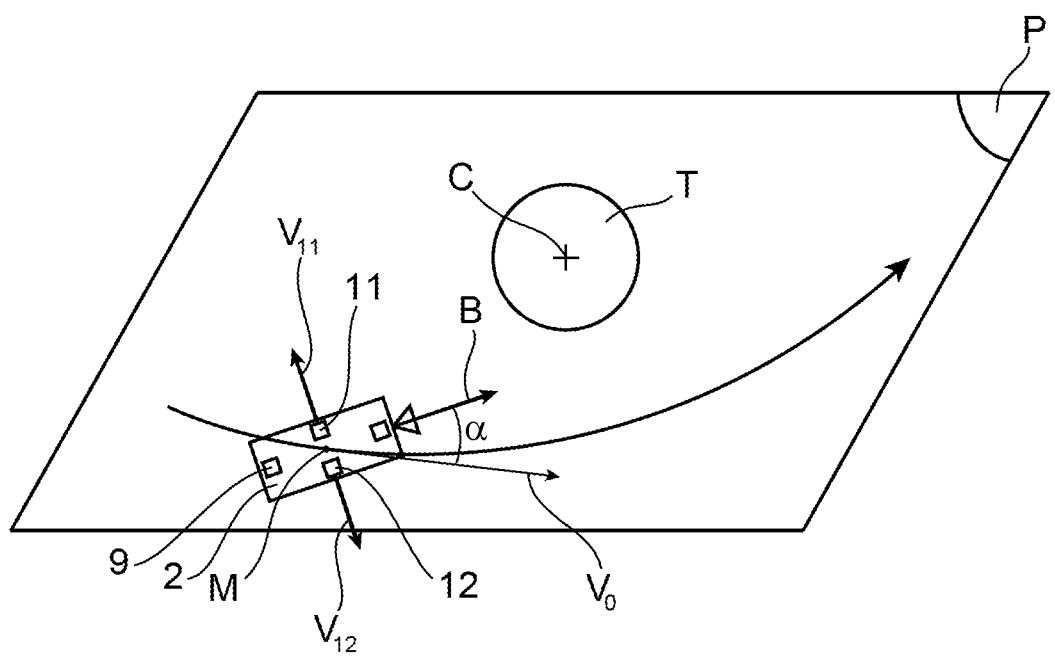

The spacecraft 1 comprises a body 2, means of propulsion 5, at least one tank 6, means 7 for ejecting a satellite which can be seen in FIG. 3, and a digital control system 9.

The body 2 of the spacecraft extends about a longitudinal axis X-X of the spacecraft. It comprises the centre of mass M of the spacecraft which is driven by an orbital speed V0 with respect to a celestial body, in particular the Earth T, when the spacecraft is about to eject at least one of the satellites 11, 12 embarked.

The propulsion means 5 comprise at least one thruster. They are configured to give a main propulsion force A and/or a continuous propulsion force B to the spacecraft 1 with respect to the celestial body T.

The tank 6 contains at least one propellant which is in liquid form, or in solid form and in particular in the form of powder. The propellant is used as a propellant material to propel the spacecraft. It is for example mixed with other propellants that are stored in other tanks 6 of the spacecraft, to propel the spacecraft 1.

The means 7 for ejecting satellites comprise for example springs. These springs form elastic means which are each configured to eject one of the satellites 11, 12 with respect to the body 2 of the spacecraft. The means 7 for ejecting a satellite are in particular configured to simultaneously eject the satellites 11, 12 of the group 10 of satellites.

The digital control system 9 comprises at least one calculator. The trajectory of the spacecraft 1 is in particular recorded in the digital control system 9 before the flight. The digital control system 9 is configured to control the means of propulsion 5 and optionally the means for ejecting 7 satellites. It forms in particular a system for controlling the spacecraft 1, able to control the implementation of a method for ejecting 100 satellites 11, 12 such as described hereinbelow.

In the first embodiment shown, the satellites 10, 11 of the first group 10 are identical.

Figure 1:
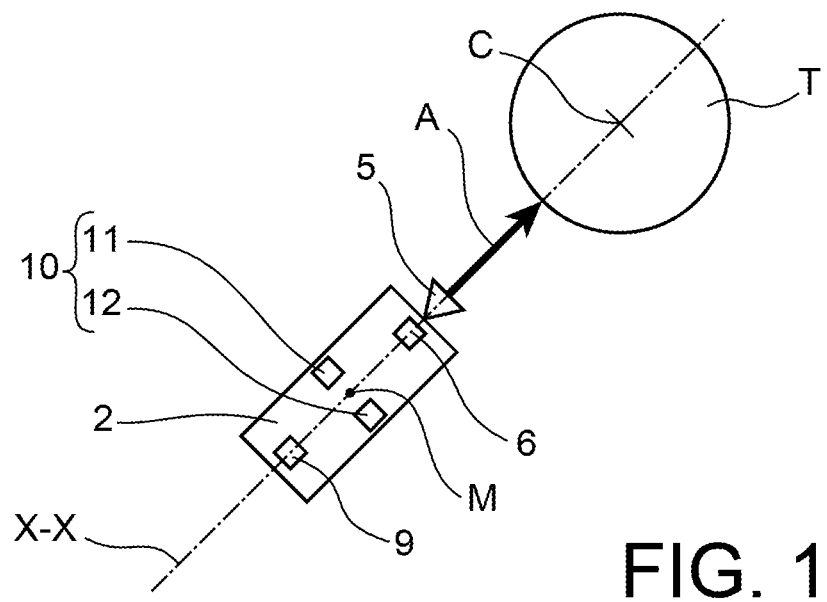
FIGS. 1 to 5 diagrammatically show the ejection of a group of satellites by a spacecraft, according to a method for ejecting according to a first embodiment of the invention.
Figure 7:
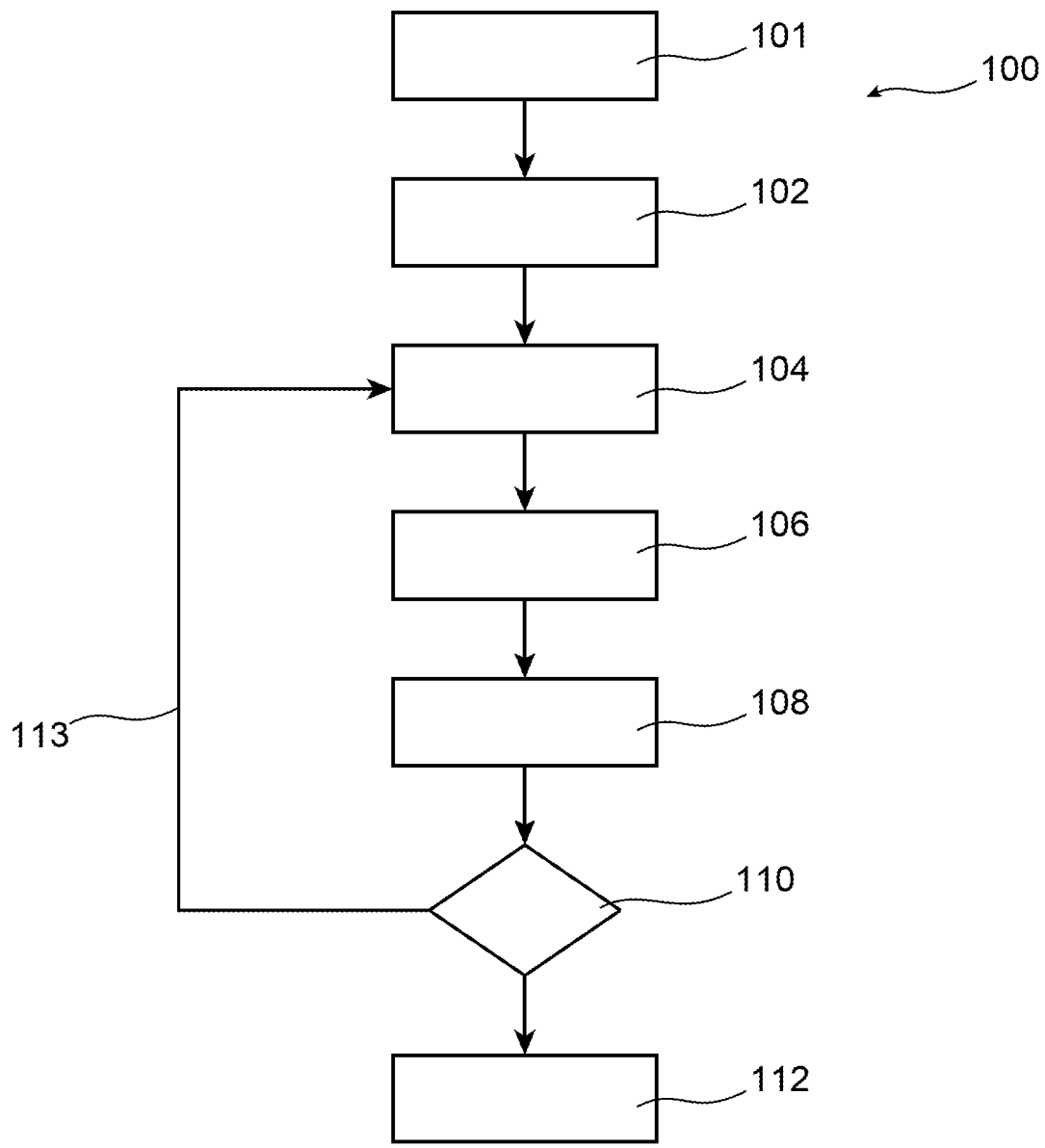
FIG. 7 diagrammatically shows in the form of a flowchart the method for ejecting according to the first embodiment or the second embodiment.

FIG. 1 and FIG. 7 show a step of main propulsion 101. The step of main propulsion 101 comprises the propulsion of the spacecraft 1, by a main propulsion force A. The satellites 11, 12 are embarked by the spacecraft 1. This main propulsion force A is created by combustion of propellants that are ejected into the propulsion means 5. It is oriented along the longitudinal axis X-X of the spacecraft 1.

The step of main propulsion 101 is used to carry the spacecraft 1 in orbit around the celestial body T around which the satellites 11, 12 are intended to gravitate. It is used in particular to move the spacecraft away from the Earth T, with a main propulsion force A of great intensity in order to escape the Earth's gravity.

Figure 2:
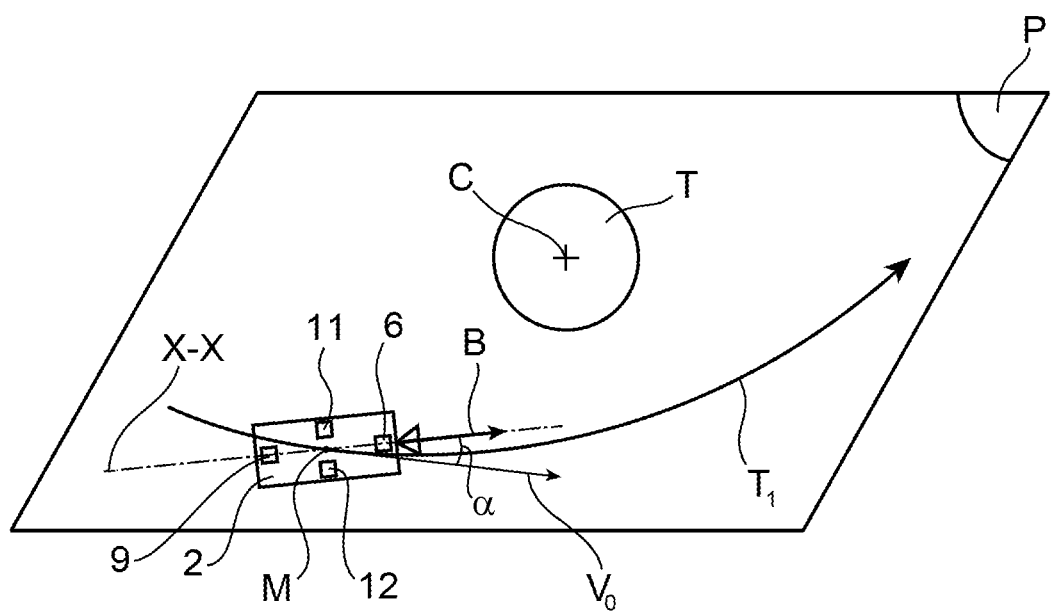

FIG. 2 and FIG. 7 show a step 102 of stopping the main propulsion A and of starting the continuous propulsion B, as well as a step 104 of orienting the longitudinal axis X-X of the spacecraft with respect to the orbital plane P of the spacecraft 1.

The main propulsion force A of the spacecraft 1 is replaced with a continuous propulsion force B. The continuous propulsion force B is exerted on the spacecraft 1 with respect to the celestial body T, in addition to the force of gravity exerted by the celestial body T. The continuous propulsion force B is oriented along the longitudinal axis X-X of the spacecraft.

The spacecraft is driven by an orbital speed V0 with respect to the celestial body T. It follows a trajectory T1 in the orbital plane P around the celestial body T. The continuous propulsion force B tends to modify the trajectory T1 of the spacecraft 1 with respect to the celestial body T. It possibly tends to modify the orbital plane P.

The intensity of the continuous propulsion force B is strictly less than that of the main propulsion force A. The ratio of the intensity of the continuous propulsion force B over the intensity of the main propulsion force A is for example comprised between $5*10^{-4}$ and $5*10^{-3}$, in particular between $3.84*10^{-4}$ and/or $3.84*10^{-3}$.

The duration of the main propulsion A is generally less than that of the continuous propulsion B, in particular when several groups of satellites are ejected. The ratio of the duration of the main propulsion force A over the duration of the continuous propulsion force B during the flight of the spacecraft is for example comprised between 0.05 and 1, preferably between 0.05 and 0.6.

The step of orienting 104 comprises the modification of the orientation of the longitudinal axis X-X of the spacecraft 1 with respect to the orbital plane P, before the ejection of at least one satellite 11, 12.

In the first embodiment, it tends to the continuous propulsion force B of the spacecraft 1 having a non-zero angle a with the orbital speed V0 of the spacecraft. The angle a between the continuous propulsion force and the orbital speed V0 is for example comprised between 5° and 45°.

In the first embodiment, the continuous propulsion force B is oriented in the direction of the orbital speed V0 of the spacecraft 1.

FIG. 3 and FIG. 7 show a step of rotating 106 the spacecraft 1 about its longitudinal axis X-X. The spacecraft 1 rotates by a non-zero angle β about its longitudinal axis X-X according to the direction of rotation R1. The step of rotating 106 is used to orient the satellites 11, 12 in rotation with respect to the orbital plane P before the ejection thereof from the body 2 by the means for ejecting 7.

Figure 5:
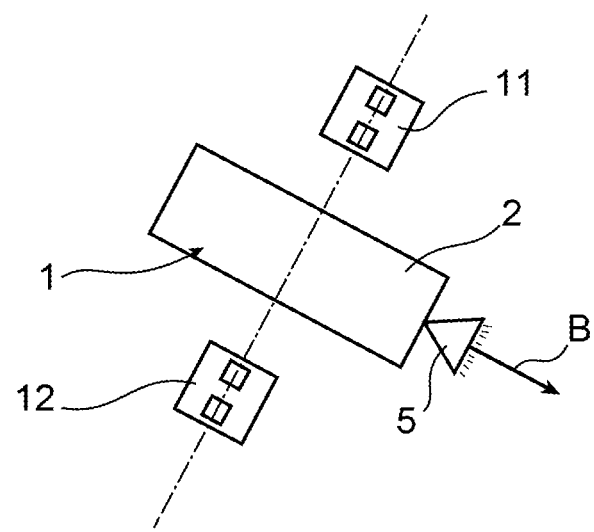
Figure 6:
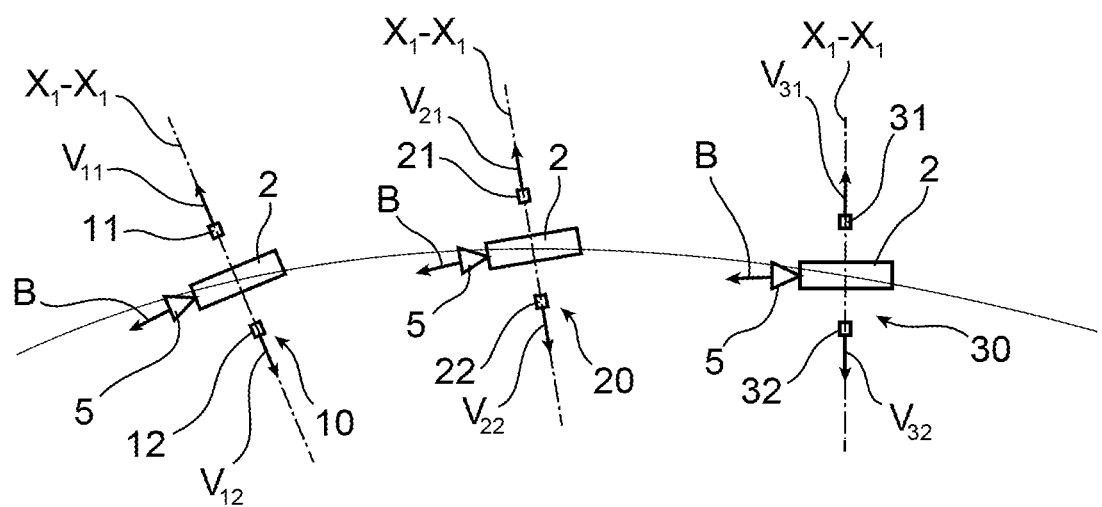
FIG. 6 diagrammatically shows the ejection of groups of satellites by a spacecraft, according to a method for ejecting according to a second embodiment of the invention.

FIG. 3, FIG. 5 and FIG. 7 show a step of ejecting 108 the first group 11 of satellites 11, 12 from the spacecraft 1 which is driven by the continuous propulsion force B during the ejection of the satellites 11, 12.

The spacecraft 1 is then driven by the continuous propulsion force B with respect to the satellites 11, 12 after the ejection thereof, which tends to move the trajectory of the spacecraft 1 away from that of the satellites 11, 12 and to prevent collisions.

The first satellite 11 and the second satellite 12 are ejected in opposite directions according to a direction X1-X1 that is orthogonal to the longitudinal axis X-X of the spacecraft. The satellites 11, 12 are then ejected in a manner equally distributed about the longitudinal axis X-X of the spacecraft 1.

The first satellite 11 is ejected from the spacecraft 1 with a speed V11 with respect to the spacecraft 1. The second satellite 12 is ejected from the spacecraft 1 with a speed V12 with respect to the spacecraft 1. They are simultaneously ejected from the spacecraft 1 by the means for ejecting 7. They then enter into orbit around the celestial body T.

Once the first satellite 11 and the second satellite 12 have been ejected, the continuous propulsion B is stopped and the main propulsion A is started again at a step 112. The spacecraft 1 is then definitively moved away from the trajectories of the satellites 11, 12. The spacecraft 1 returns for example in the terrestrial atmosphere or it definitively escapes the Earth's gravitational attraction.

More generally, the step of ejecting 108 comprises a simultaneous ejection order of the satellites 11, 12 of the group 10 of satellites by the digital control system 9, and the physical ejection of the satellites 11, 12 from the spacecraft 1 by the means for ejecting 7 following this order and optionally with a slight delay.

The method for ejecting 100 according to the second embodiment is distinguished from that of the first embodiment by the number of satellites that are ejected. In this embodiment, three groups 10, 20, 30 of satellites are successively ejected from the spacecraft 1 around the celestial body T without interruption of the continuous propulsion B between the ejection of the different groups.

Each one of the groups 10, 20, 30 of satellites includes two satellites 11, 12, 21, 22, 31, 32. The satellites 11, 12 within the first group 10 are in particular identical between them. The satellites 21, 22 within the second group 20 are in particular identical between them. The satellites 31, 32 within the third group 30 are in particular identical between them.

The step of main propulsion 101 is similar to that of the first embodiment. The step 102 of stopping the main propulsion A and of starting the continuous propulsion B is similar to that of the first embodiment. These steps 101, 102 take place one time during the course of the flight before the step of ejecting 108 the first group 10 of satellites.

The step 104 of orienting the longitudinal axis X-X of the spacecraft with respect to the orbital plane P of the spacecraft 1 and/or the step of rotating 106 the spacecraft 1 about its longitudinal axis X-X are optional for the second group 20 of satellites and/or for the third group 30 of satellites.

The step of ejecting 108 takes place for the second group 20 of satellites and for the third group 30 of satellites, i.e. for each group 10, 20, 30 of satellites embarked by the spacecraft. The step of ejecting 108 comprises a simultaneous ejection order of the satellites 11, 12, 21, 22, 31, 32 within a group, and the ejection of the satellites 11, 12, 21, 22, 31, 32 possibly with a slight delay following this order.

The step 112 of igniting the main propulsion A is similar to that of the first embodiment. It takes place once all the satellites 11, 12, 21, 22, 31, 32 have been ejected.

The method for ejecting 100 according to the second embodiment is described in more detail hereinbelow, from the step of ejecting 108 the first group 10 of satellites.

In the second embodiment, the step of ejecting 108 comprises the ejection of at least one first group 10 of two satellites 11, 12. These two satellites 11, 12 are ejected according to a direction X1-X1 orthogonal to the longitudinal axis X-X of the spacecraft and in opposite directions. The satellites 11, 12 of the first group are simultaneously ejected from the spacecraft 1.

The method for ejecting 100 continues in step 110 with the verification of the presence of satellites 21, 22, 31, 32 embarked by the spacecraft 1.

The step of ejecting 108 is reiterated according to the arrow 113 for the ejection of the second group 20 of satellites, and possibly the steps 104, 106 beforehand for this group of satellites.

The step 104 of orienting the longitudinal axis X-X of the spacecraft with respect to the orbital plane P of the spacecraft 1 is repeated for the second group 20 of satellites if necessary. The step of rotating 106 the spacecraft 1 about its longitudinal axis X-X is repeated for the second group 20 of satellites if necessary.

The method for ejecting 100 then comprises the ejecting of the second group 20 of two satellites 21, 22. These two satellites 21, 22 are ejected from the spacecraft 1 according to the direction X1-X1 and in opposite directions. The satellites 21, 22 of the second group are simultaneously ejected from the spacecraft 1.

The method for ejecting 100 continues in step 110 with the verification of the presence of satellites 31, 32 embarked by the spacecraft 1. The step of ejecting 108 is reiterated according to the arrow 113 in order to eject the third group 30 of satellites, and possibly the steps 104, 106 beforehand for this group of satellites.

The step 104 of orienting the longitudinal axis X-X of the spacecraft with respect to the orbital plane P of the spacecraft 1 is repeated for the third group 30 of satellites if necessary. The step of rotating 106 the spacecraft 1 about its longitudinal axis X-X is repeated for the third group 30 of satellites if necessary.

The method for ejecting 100 then comprises the ejection of the third group 30 of two satellites 31, 32. These two satellites 31, 32 are ejected from the spacecraft 1 along a direction X1-X1 and in opposite directions. The satellites 31, 32 of the third group are simultaneously ejected from the spacecraft 1.

The three satellites 11, 21, 31 were ejected in orbit with identical orientations. The three satellites 12, 22, 32 were ejected in orbit with identical orientations.

In the second embodiment, the spacecraft 1 is driven by a continuous propulsion force B from the step of ejecting 108 the first group 10 of satellites until the step of ejecting 108 the third group 30 of satellites.

The main propulsion force A resumes in step 112, when all the satellites 11, 12, 21, 22, 31, 32 have been ejected from the spacecraft 1.

In the first embodiment and in the second embodiment, the spacecraft 1 is driven by the continuous propulsion force B from the stopping of the main propulsion force A at least until all the satellites 11, 12, 21, 22, 31, 32 are ejected from the spacecraft 1. The continuous propulsion force B in particular has a constant value during this period.

Generally, the spacecraft 1 is driven by a continuous propulsion force B at least to the ejection of at least one satellite 11, 12, 21, 22, 31, 32, i.e. shortly before and shortly after the ejection of this satellite 11, 12, 21, 22, 31, 32.

In particular, the consumption of propellant material is reduced during the method for ejecting 100, due to the limitation in the number of ignition and extinction of the propulsion means 5 of the spacecraft 1.

Moreover, due to the continuous propulsion force B of the spacecraft 1, each propellant is maintained at the bottom of its tank 6, which prevents the dispersion and the heating thereof in its tank 6. The consumption of propellant material during the method of ejecting 100 is then further limited, in particular if the main propulsion A is restarted.

The method for ejecting 100 thus makes it possible to eject at least one satellite 11, 12, 21, 22, 31, 32 in orbit, by preventing collisions and by limiting the consumption of propellant material.

The method for ejecting 100 also tends to limit the complexity of the trajectory of the satellite 11, 12, 21, 22, 31, 32 and of that of the spacecraft 1.

Of course, various modifications can be made by those skilled in the art to the invention that has just been described without leaving the scope of the disclosure of the invention.

Alternatively, the propulsion means 5 comprise at least one main thruster for the main propulsion of the spacecraft 1, and at least one secondary thruster for the continuous propulsion of the spacecraft 1 during phases of ejecting satellites. In this case, each secondary thruster has a lower power than that of each main thruster.

Alternatively, the propellant can be replaced with a gas that is used as a propellant material for the spacecraft 1.

Alternatively, the digital control system 9 is configured to calculate in flight, particularly in real time, the trajectory of the spacecraft 1 and the instant of the ejection of at least one satellite 11, 12, for example in order to correct the trajectory of the spacecraft 1 in case of an unforeseen event.

The satellites 10, 11, 21, 22, 31, 32 can be identical or not. In particular, their mass and their function can vary.

The number of satellites 11, 12 embarked by the spacecraft 1 can vary. For example, the spacecraft 1 can take off with a single satellite 11. Moreover, the number of satellites 11, 12, 21, 22, 31, 32 of each group 10, 20, 30 can vary.

The satellites 11, 12, 21, 22, 31, 32 can be ejected with variable orientations, which may be different between them.

The instants of stopping the main propulsion A and starting the continuous propulsion B can vary. In particular, the continuous propulsion B can replace the main propulsion A at least one certain time before the spacecraft 1 arrives at the ejection orbit of the first group 10 of satellites. Moreover, the instant of starting the continuous propulsion B can take place a certain time after the stopping of the main propulsion A.

Alternatively, the spacecraft 1 is devoid of a main A or continuous B propulsion force once all the satellites 11, 12 have been ejected.

Alternatively, the propulsion force B is oriented in the same direction as the orbital speed V0.

Alternatively, the continuous propulsion force B is inclined with respect to the orbital plane P, in particular when the longitudinal axis X-X is inclined with respect to the orbital plane P of the spacecraft 1 during the starting of the continuous propulsion force B.

Alternatively or in addition, the continuous propulsion force B is oriented in a direction opposite the orbital speed V0 during the ejection of at least one of the satellites 11, 12, 21, 22, 31, 32.

What is claimed is:

1. A method for ejecting at least one payload such as a satellite, the method comprising a step of ejecting the payload from a spacecraft, the spacecraft being driven by a continuous propulsion force when the payload is ejected, and a main propulsion step to carry the spacecraft on an orbit before the step of ejecting, wherein an intensity of the continuous propulsion force is strictly less than an intensity of a main propulsion force, wherein the continuous propulsion force is non zero, and wherein the spacecraft is driven by the continuous propulsion force from a stopping of the main propulsion force at least until the payload is ejected from the spacecraft.

2. The method for ejecting at least one payload according to claim 1, comprising the ejection of several payloads from the spacecraft during the flight of the spacecraft, wherein the step of ejecting comprises the ejection of at least one first group of payloads comprising at least one payload, and/or the ejection of at least one second group of payloads comprising at least one payload.

3. The method for ejecting according to claim 2, wherein the payloads of the first group are simultaneously ejected from the spacecraft and/or wherein the payloads of the second group are simultaneously ejected from the spacecraft,
wherein the step of ejecting the first group comprises a simultaneous ejection command of the payloads of the first group and the ejecting physically of the payloads of the first group from the spacecraft following the ejection command, and/or wherein the step of ejecting of the second group comprises a simultaneous ejection command of the payloads of the second group and the ejecting physically of the payloads of the second group from the spacecraft following the ejection command.

4. The method for ejecting according to claim 3, wherein the step of ejecting comprises the ejection of two payloads according to a direction orthogonal to the longitudinal axis of the spacecraft and in opposite directions.

5. The method for ejecting according to claim 1, comprising a step of orienting the longitudinal axis of the spacecraft with respect to the orbital plane, before the ejection of the at least one payload, and/or
a step of rotating the spacecraft about its longitudinal axis in order to orient the at least one payload in rotation with respect to the orbital plane before the ejection thereof.

6. The method for ejecting according to claim 1, comprising the ejection of at least two payloads with identical orientations on their orbit.

7. The method for ejecting according to claim 1, comprising a non- zero angle between the continuous propulsion force of the spacecraft and the orbital speed of the spacecraft during the ejection, and/or
wherein the continuous propulsion force is oriented according to a longitudinal axis of the spacecraft during the ejection.

8. The method for ejecting at least one payload according to claim 1, wherein the continuous propulsion force of the spacecraft is oriented in the direction of the orbital speed during the ejection, or
wherein the continuous propulsion force is oriented in a direction opposite the orbital speed during the ejection.

9. The method for ejecting according to claim 1, wherein the ratio of the intensity of the continuous propulsion force over the intensity of the main propulsion force is between $5*10^{-4}$ and $5*10^{-3}$,
wherein the ratio of the duration of the main propulsion force over the duration of the continuous propulsion force is between 0.05 and 1.

10. The method for ejecting according to claim 1, wherein the ratio of the intensity of the continuous propulsion force over the intensity of the main propulsion force is between $3.84*10^{-4}$ and $3.84*10^{-3}$, wherein the ratio of the duration of the main propulsion force over the duration of the continuous propulsion force is between 0.05 and 0.6.

11. The method for ejecting according to claim 1, wherein the spacecraft is propelled by at least one propellant which is stored in powder or liquid form in a tank.

12. The method for ejecting according to claim 2, wherein the spacecraft is driven by a continuous propulsion force between the step of ejecting the first group of payloads and the step of ejecting the second group of payloads.

13. The method for ejecting according to claim 2, wherein the spacecraft is driven by a continuous propulsion force from the step of ejecting the first group of payloads at least to the step of ejecting the second group of payloads.

14. The method for ejecting according to claim 1, wherein the spacecraft is again driven by the main propulsion force when the payload or all the payloads have been ejected from the spacecraft.

15. The method for ejecting according to claim 3, wherein the payloads of the first group are ejected in directions which are equally distributed about the longitudinal axis of the spacecraft when the payloads are identical, and/or
wherein the payloads of the second group are ejected in directions which are equally distributed about the longitudinal axis of the spacecraft when the payloads are identical.

16. The method for ejecting according to claim 1, wherein the payload is a satellite.

17. The method according to claim 1, wherein the propulsion force is generated by a thruster of the spacecraft.

* * * * *